US005788068A

United States Patent [19]

Fraser et al.

[11] Patent Number: 5,788,068
[45] Date of Patent: Aug. 4, 1998

[54] APPARATUS FOR HOLDING A COMPACT DISK

[75] Inventors: Anthony Henry Joseph Fraser, London; Peter Antony Farrar, Rawdon; Stefan Alexander Pijanowski, Oundle, all of United Kingdom

[73] Assignee: Dubois Limited, United Kingdom

[21] Appl. No.: 817,897

[22] PCT Filed: Nov. 3, 1995

[86] PCT No.: PCT/GB95/02581

§ 371 Date: Apr. 30, 1997

§ 102(e) Date: Apr. 30, 1997

[87] PCT Pub. No.: WO96/14636

PCT Pub. Date: May 17, 1996

[30] Foreign Application Priority Data

Nov. 3, 1994 [GB] United Kingdom ............... 9422190

[51] Int. Cl.[6] .................................................. B65D 85/57
[52] U.S. Cl. ....................... 206/310; 206/308.1; 206/493
[58] Field of Search ............................ 206/310, 493, 206/308.1

[56] References Cited

U.S. PATENT DOCUMENTS 5,251,750  10/1993  Gelardi .
5,377,825   1/1995  Sykes et al. .................... 206/310 X

FOREIGN PATENT DOCUMENTS

| 0356539 | 3/1990 | European Pat. Off. . | |
| 0429195 | 5/1991 | European Pat. Off. . | |
| 3425579 | 1/1986 | Germany . | |
| 3715187 | 11/1988 | Germany . | |
| 404057778 | 2/1992 | Japan | 206/310 |
| 405051082 | 3/1993 | Japan | 206/310 |
| 63-2243145 | 10/1991 | United Kingdom | 206/310 |
| 9301598 | 1/1993 | WIPO . | |

*Primary Examiner*—Bryon P. Gehman
*Attorney, Agent, or Firm*—Webb Ziesenheim Bruening Logsdon Orkin & Hanson, P.C.

[57] ABSTRACT

An apparatus for holding a compact disk has a base portion and resilient inwardly extending radial arms, cantilevered from the base portion; the inner ends of the arms form a button-like member receivable in the central hole of the disk so that pressure applied to any one or more of the inner ends of the arms flexes each of the arms toward the base portion to move the inner ends of the arms toward each other sufficiently to release the button-like member from the disk. Lips on the button-like member retain the disk by engaging on the outer surface of the disk. Resilient ejection means may be provided to urge the compact disk out of engagement with the button-like member, and disk support means may be on the base portion to support the disk at positions away from the central hole of the disk. The apparatus may be formed as a one-piece plastics molding as a tray for insertion in a box or as part of a wall of a video style library box.

28 Claims, 8 Drawing Sheets

APPARATUS FOR HOLDING A COMPACT DISK

TECHNICAL FIELD

This invention relates to apparatus for holding a compact disk, to disk storage containers and video style library boxes incorporating such apparatus, and to a method of manufacturing such apparatus, containers and boxes.

By "compact disk", in the context of this specification, is meant not only the relatively common standard 120 mm diameter laser-readable disk such as are currently sold carrying, for example, pre-recorded music, computer software and data, and similar recordable disks, but also similar disks of various sizes such as are known or proposed for recording video, films, interactive games and other information or data.

BACKGROUND ART

Conventionally, when not in use, such compact disks are stored in clear polystyrene boxes, known as "jewel cases", wherein the disk is held on a separate tray fitted in the case and having seven or eight tines arranged to form a boss or "rosette" with which the aperture in the centre of a compact disk may be releasably engaged.

The legs or tines of the rosette are shaped such that they extend upwardly from the tray, curve outwardly, such that they can grip a compact disk, and then, towards their ends, curve inwardly to provide a boss over which the hole in the compact disk may be manually pushed.

It has long been recognised that such apparatus for holding a compact disk is not very satisfactory because it requires two hands to release a disk and lift it from the rosette; consequently many people do not attempt to push the centre of the rosette but instead use just one hand to grasp an outer edge of a compact disk and wrench it off the rosette thereby bending the disk, sometimes scoring the recorded surface of the disk on the tines, and eventually distorting or even breaking the tines.

Such bending and scoring of the disk can be especially critical when, as is now often the case, the disk carries compressed, or "stacked", computer software, or computer readable data.

There have been many attempts to overcome the above problems and provide a more reliable and readily releasable disk-holding apparatus.

For example, EPA-0356539 proposed apparatus in which the rosette was provided with a central pushing part having cranked flap pieces arranged such that pressing down the pushing part would cause the cranked flap pieces to push a disk up and off the disk-engagement tines. EPA-0429195 proposed the use of resilient means to urge the disk out of engagement with the central boss. PCT WO-A-93/01598 proposed a release button arranged to engage all the inner ends of the legs of the rosette and a spring designed to remain with no tension during disk storage but to "pop-up" the disk should the button be pressed. U.S. Pat. No. 5,251,750 proposes linking the inner ends of all the tines by a "live" or "living" hinge produced by a reduced thickness in the moulded material whilst also suggesting linking the button to four cranked ejection arms arranged such that depressing the button causes the ejection arms to push a compact disk off the rosette.

DE-A3425579 discloses a disk storage cassette having a spigot arrangement for holding a disk. The spigot arrangement comprises spigot tongues which are connected by a pressure plate so that the spigot reduces in diameter when a load is applied to the pressure plate. The spigot tongues are provided with retaining or locking cams for engaging the central hole of the disk. The disk is held by the spigot in contact with a raised support on the base of the cassette.

Such poor art is of relatively complex construction so is difficult and hence expensive to manufacture and/or does not operate easily or as reliably as may be desired.

An object of this invention is to improve on the prior art to provide apparatus for holding a compact disk, suitable for incorporating in a tray of a disk storage container and in a video style library box, which is reliable and easily operable to release a compact disk stored thereon. Other potential advantages of the invention will be apparent from the following description.

DISCLOSURE OF INVENTION

According to a first aspect of the invention there is provided apparatus for holding a compact disk having a central hole, the apparatus comprising: a base portion; disk engaging means extending from the base portion for releasably engaging the central hole of the disk, the disk engaging means comprising at least two inwardly extending radial arms each resiliently cantilevered from the base portion, the inner ends of the arms together forming a button-like member and having rims, or lips, arranged to securely retain a disk by engaging on the outwardly facing surface of a compact disk held by the disk engaging means, the arrangement being such that, to release the disk, pressure must be applied to the button-like member to depress the arms, and hence depress at least the centre of the compact disk, until movement of the inner ends of the arms towards each other caused by said depression of the arms is sufficient to release the engagement of the rims or lips on the outwardly facing surface of the compact disk.

Advantageously, the inner ends of adjacent arms forming the button-like member are interconnected by an integral living hinge, but alternatively the inner ends of the arms may be interconnected by a second button-like member engaging the inner ends of each of the arms.

Moreover, the button-like member advantageously presents a generally concave outer surface so as to reduce the possibility of any accidental contact acting on the inner end so any of the arms and thereby accidentally releasing the compact disk.

Preferably, resilient ejection means arranged to urge the disk out of engagement with the disk engaging means upon release of the engagement of the, rims or lips on the outwardly facing surface of the disk are provided.

Furthermore, the resilient ejection means is preferably arranged to support a disk away from the base when a disk is held by the disk engaging means, so that during handling and storage the disk is supported by the resilient means to cushion the disk from any shock.

Indeed, according to another aspect of the invention there is provided apparatus for holding a compact disk having a central hole, the apparatus comprising: a base portion, disk-engaging means extending from the base portion for releasably engaging the central hole of the disk, and resilient ejection means arranged to urge the compact disk out of engagement with the disk-engaging means when the disk-engaging means is released, the resilient ejection means being arranged to resiliently support the disk away from the base when the disk is held by the disk-engaging means. The resilient ejection means thus protects the disk from undue shock loads during handling or transit.

Also, the resilient ejection means preferably comprises a plurality of further resilient inwardly extending arms cantilevered from the base; alternatively, the resilient ejection means may comprise one or more pieces of compressible material which is compressed when a disk is held by the disk engaging means and expands to move the disk out of engagement with the disk engaging means when the disk engaging means is released.

According to a further aspect of the invention there is provided apparatus for holding a compact disk having a central hole, the apparatus comprising: a base portion, disk-engaging means extending from the base portion for releasably engaging the central hole of the disk, and disk support means on the base portion for supporting the disk at positions away from the central hole, the arrangement being such that, in use the centre of the disk may be flexed towards the base portion such that upon release of the engagement of the disk engaging means with the central hole, the disk is able to revert to an unstressed state so as to move the centre of the disk out of engagement with the disk engaging means.

The resiliency of the disk itself is used in this arrangement to permit the required movement of the centre of the disk and to move the disk away from the base portion when engagement with the disk-engaging means has been released.

The disk support means are preferably provided at a plurality of locations around the outer edge of the disk and when a disk is held by the disk engaging means it is preferably held clear of the disk support means.

It should be understood that apparatus according to the invention can be incorporated into a tray for fitting into a conventional "jewel case" compact disk container, or can be incorporated in a video style library box, and in either case, with the obvious exception of any separate second button and/or separate resilient ejection means of compressible material, the tray or the box may be formed as an integral one-piece, one shot, injection moulding of a plastics material such as polypropylene or a copolymer of butadene and styrene.

Thus, according to another aspect of the invention, there is provided a video style library box formed as a one-piece moulding characterised by the provision therein of disk-engaging means for releasably engaging the central hole of a compact disk. Preferably the disk-engaging means is integrally formed with a wall of the box and comprises apparatus of the type referred to above.

Other features of this invention will be apparent from the following description and the subsidiary claims of the specification.

BRIEF DESCRIPTION OF DRAWINGS

The invention will now be further described, merely by way of example, with reference to the following drawings, in which.

BEST MODE OF CARRYING OUT THE INVENTION

The video style library box shown in FIGS. 1 to 8 comprises a lid portion 11, a base portion 12 and a spine portion 13, which is connected to the lid portion 11 and to the base portion 12 by living hinges 14.

Within the lid portion 11 moulded, spring clip-like, devices 11A are provided for holding a printed booklet or leaflet to be included with the disk, and within the base portion 12 is moulded a partially annular rim 12A that protects the disk should any loose booklet or the like be left in the box and also constitutes an aesthetic frame around the disk held in the box. When the box is closed, male parts 11B of a closure clip on the lid portion 11 engage with female pus 12B of the clip provided on the base portion 12.

Moulded integrally in the base portion 12 is the apparatus for holding a compact disk (a disk being shown only in FIGS. 6, 7 and 8), the apparatus comprising the base portion 12 of the box, two resilient inwardly extending radial arms 15 each cantilevered from the base portion 12 and interconnected at their inner ends, the inner ends being formed to provide a disk-engaging button-like member indicated generally as 16 and described in more detail hereinafter with reference to FIGS. 6 and 7; and four resilient inwardly extending disk ejection arms 17 also cantilevered from the base portion 12 as described in more detail hereinafter with reference to FIG. 8.

Figure 4:
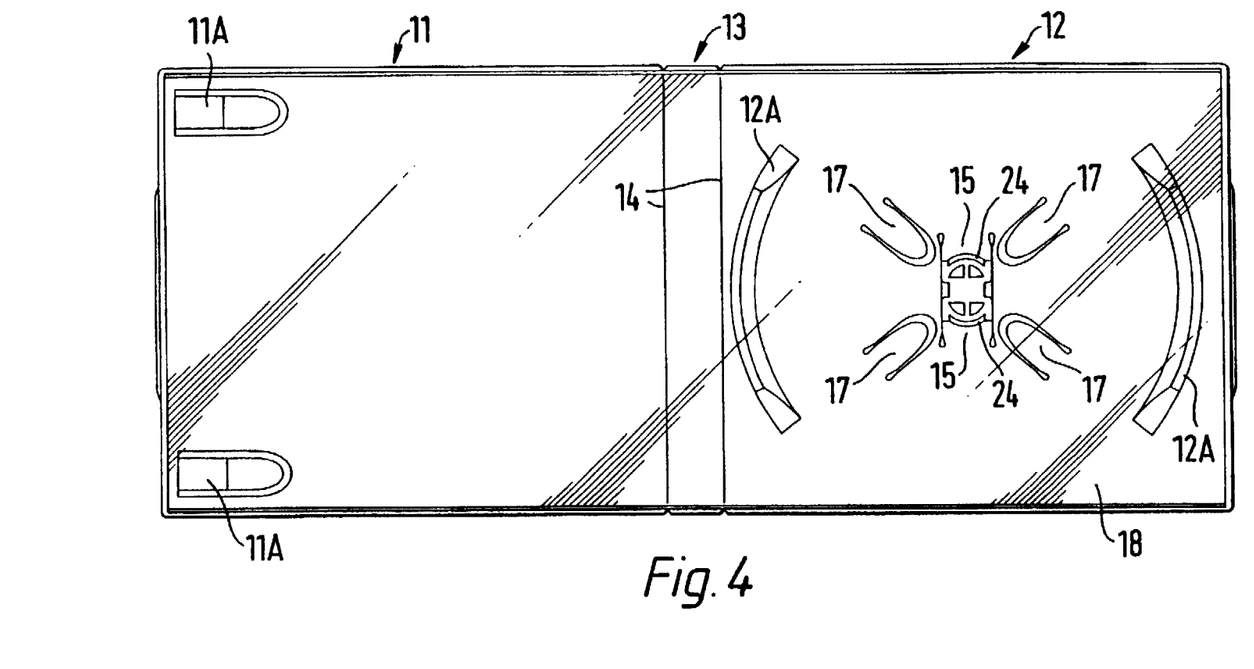
Figure 5:
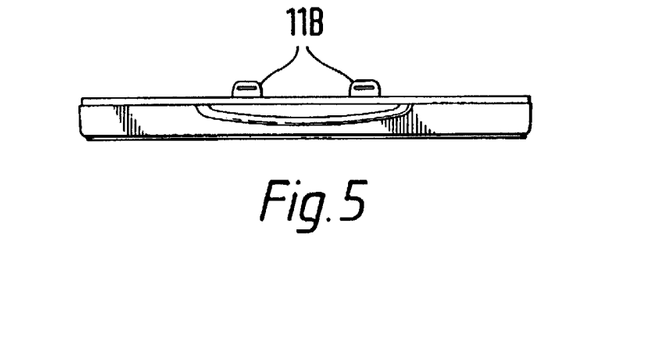

The box is injection moulded in polypropylene or a copolymer of butadene and styrene, and the base portion 12 is apertured, with "cut aways", below the arm 15 and the arms 17 (as shown in FIG. 4) to allow the complete box to be formed in a one-shot, one-piece, moulding; subsequently (as in conventional library style video boxes) a clear plastic sheet 18 (see FIGS. 3 and 4) may be welded across the outside of box, and a descriptive paper jacket or the like (not shown) may be inserted between the box and the sheet 18 to identify the contents of the box and also hide any cutaways in the base 12 of the box that might othewise be deemed unsightly.

Figure 6:
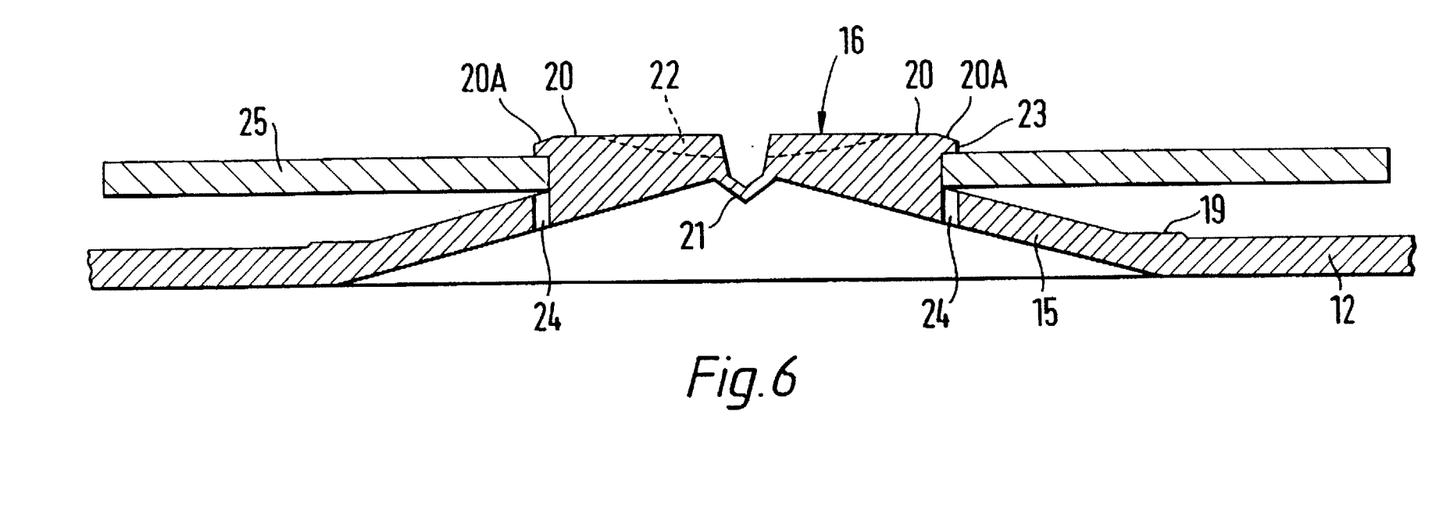
FIG. 6 is a cross-sectional view taken on the line 6—6 in FIG. 2 showing a compact disk held in the apparatus.
Figure 7:
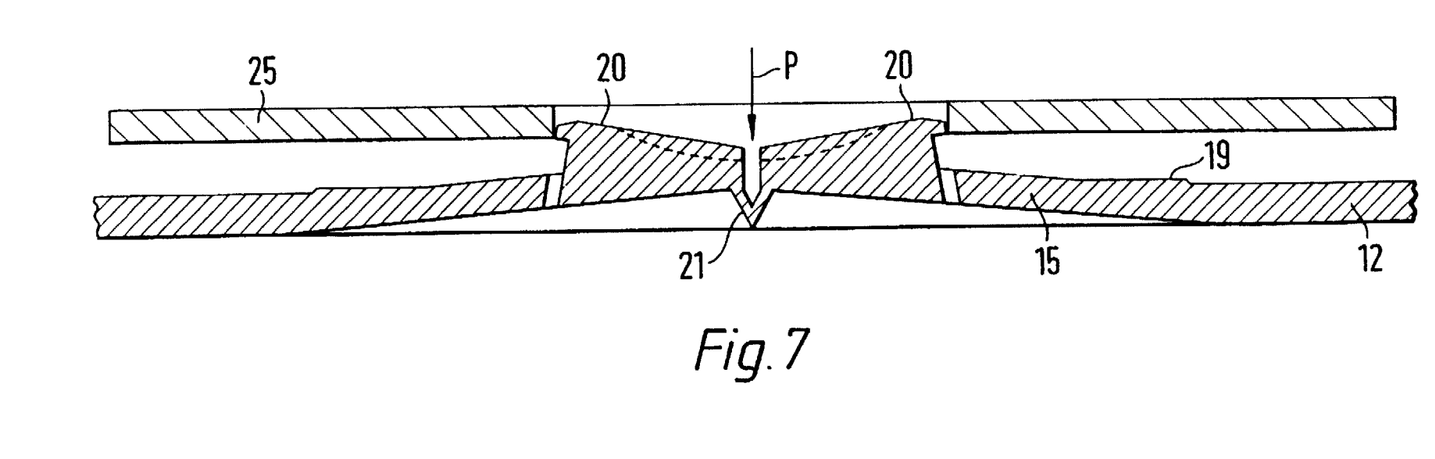
FIG. 7 is a similar view to FIG. 6 but showing the apparatus in the disk-release position.

Referring now to FIGS. 6 and 7, where the two inwardly extending radial arms 15 are cantilevered from the base portion 12, the base portion 12 may, if desired, be reinforced by a thickening 19 of the moulding. The disk-engaging button-like member identified generally as 16 is moulded as two substantially semi-circular segments 20, interconnected by an integral living hinge 21 to ensure that if either segment is depressed the other segment will also move.

Although it is preferable for the segments 20 to form together a button-like member 16, it should be understood that in some cases the segments 20 can be mechanically interconnected by, for example, a separate second button-like member (not shown).

Moreover, the outer surface of the button-like member 16 may be formed with a generally concave outer surface as indicated by the dotted line 22 such that any accidental contact on the button-like member 16 is unlikely to act against the inner ends of either of the arms 15.

The semi-circular segments 20 are preferably each moulded with a disk-retaining capping rim, or lip, 23, which overlies an aperture or cut-away 24 in the respective arm 15 to allow the capping rims, or lips, 23 to be formed during the one-shot moulding operation.

To engage a compact disk 25 on the apparatus, it is laid with its central aperture resting over the segments 20. The disk is then manually pressed towards the base portion 12 whereupon the edges of the central aperture ride over chamfered edges 20A of the segments 20. The downward pressure thus applied by the disk 25 to the segments 20 flexes the arms 15 towards the base portion 12 causing the segments 20 to move towards each other until they are able to pass through the central aperture so the arms 15 can revert to their unflexed, or substantially unflexed, positions.

As will be seen in FIG. 6, the segments 20 are adapted to engage within the central aperture of a compact disk, such as shown at 25, with the capping rims, or lips, 23 securely retaining the disk 25 by engaging the upper surface thereof adjacent the central hole. To release the disk from the apparatus, pressure, such as indicated by the arrow "P" in FIG. 7, is applied to depress the segments 20 and hence the arms 15 towards the base portion 12, thereby disengaging the capping rims, or lips 23 from the upper surface of the disk 25 and so allowing the disk to be disengaged from the segments 20. Due to the mechanical interconnection provided between the segments 20, it will be appreciated that even if pressure is not applied centrally to the button-like member 16, the segments will still all move so as to disengage from the central hole of the disk 25.

It will also be appreciated that in order to allow the capping rims, or lips 23 to disengage from the disk 25 without damaging the edge of the central hole thereof, at least the centre of the disk 25 must be allowed to move to some extent towards the base portion 12 as the pressure P is applied. The resilient ejection arms 17 also allow the centre of the disk 25 to be pressed towards the base portion 12 as the disk 25 is being engaged on the apparatus.

Disengagement of the disk 25 from the segments 20 is effected by the four resilient inwardly extending disk ejection arms 17 which act to move the disk 25 away from the base portion 12 when the engagement of the capping rims or lips 23 with the disk is released. The disk 25 thus "pops up" ready for removal from the apparatus. The arms 15 may also help lift the disk 25 as they revert to their unflexed positions when pressure P is removed.

Figure 1:
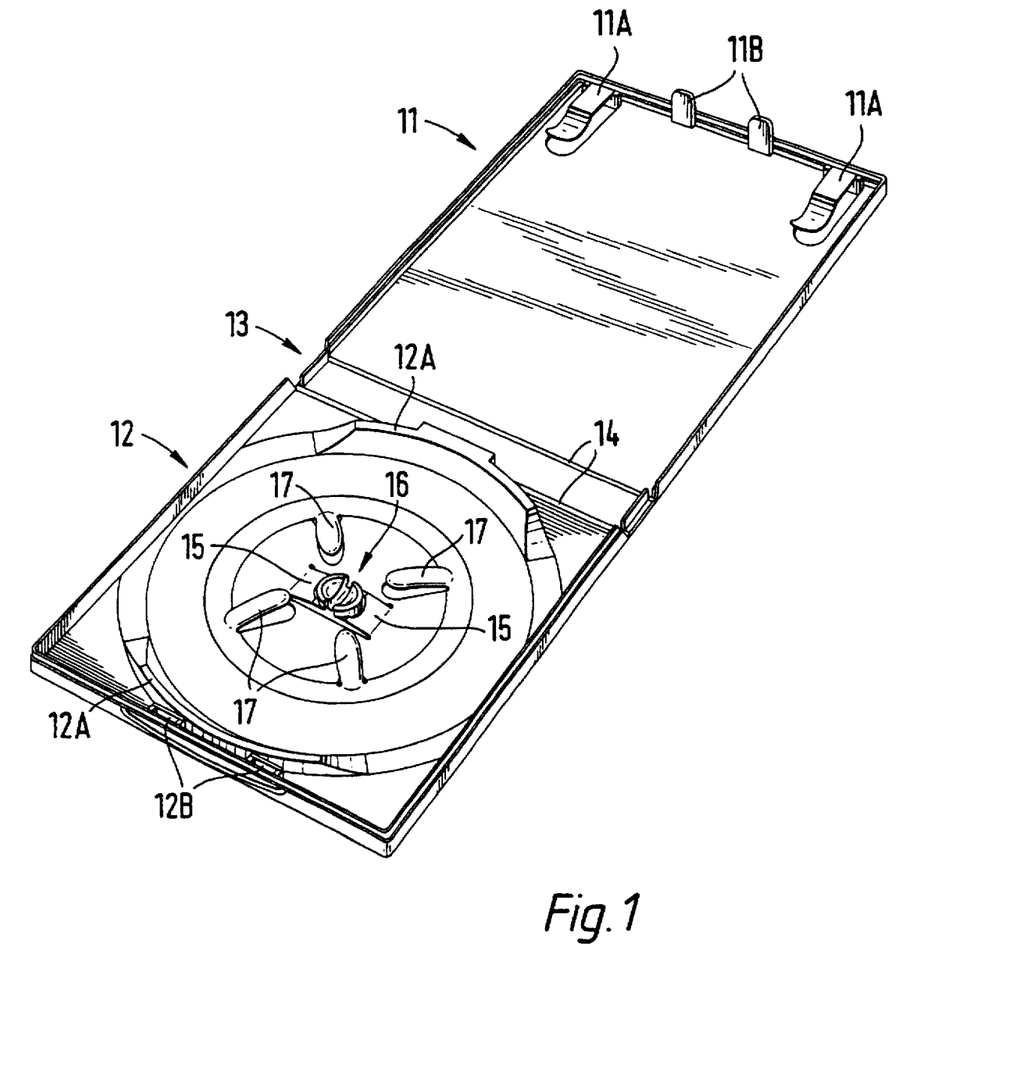
FIG. 1 is a perspective view of a video style library box incorporating apparatus for holding a compact disk according to one aspect of the invention.
Figure 2:
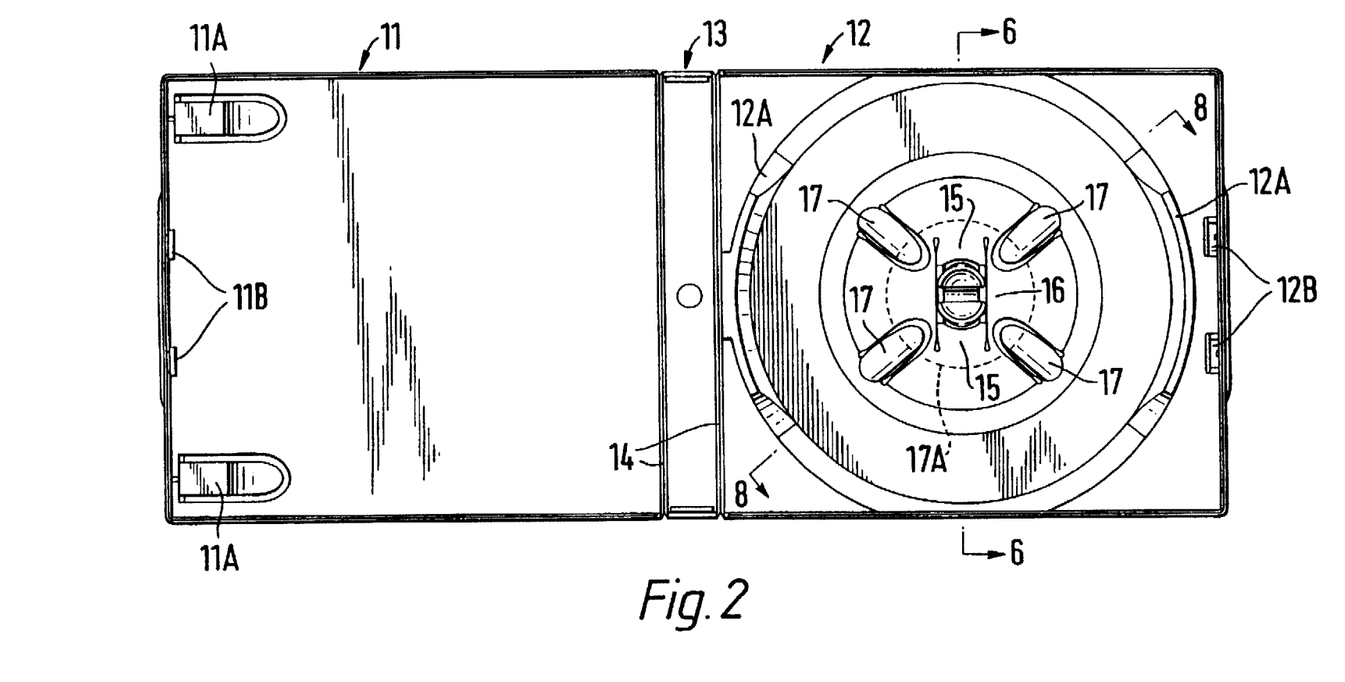
FIG. 2 is a plan view of the box shown in FIG. 1.
Figure 3:
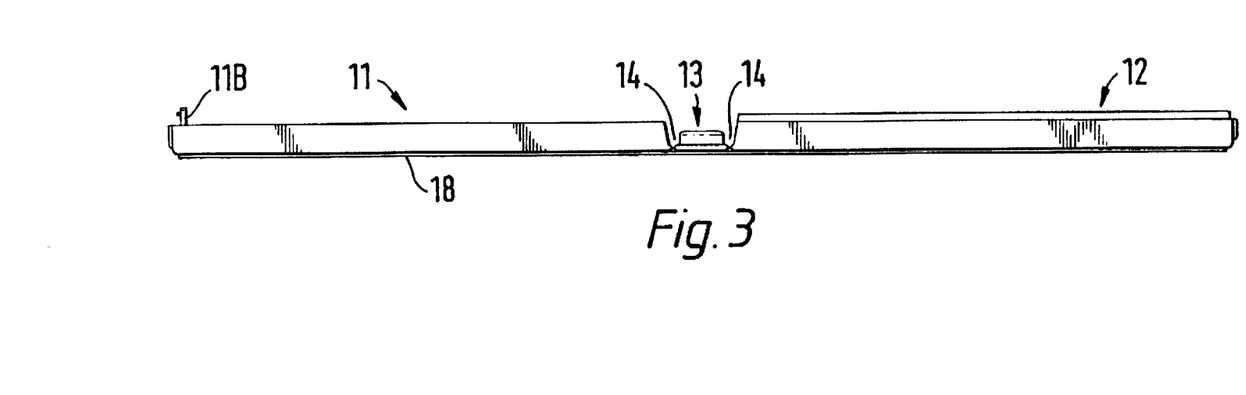
FIGS. 3, 4 and 5 show a side view, underneath plan view and end view, respect of the box shown in FIG. 1.
Figure 8:
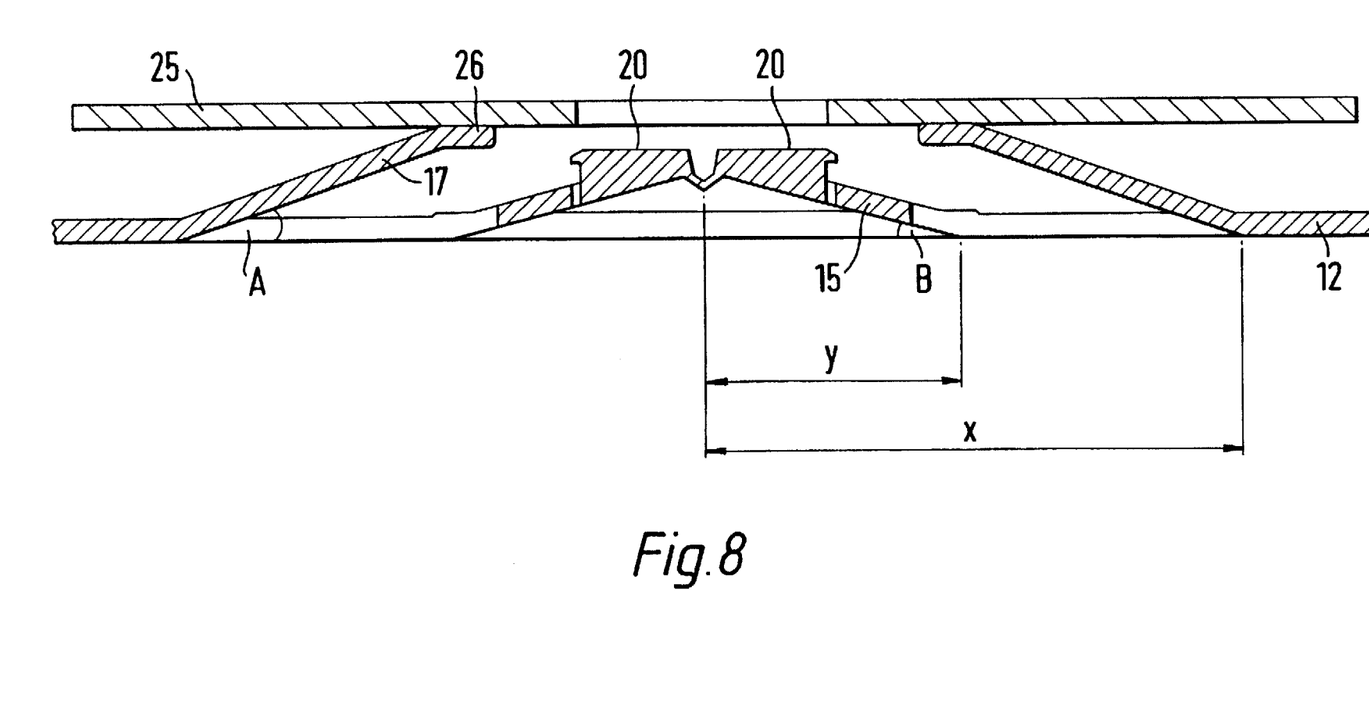
FIG. 8 is a schematic cross-sectional view of the apparatus according to the invention illustrated in the previous Figures taken partially on line 6—6 in FIG. 2 and partially on line 8—8 in FIG. 2 and showing a compact disk in position to be engaged with the apparatus.

As will be seen in FIG. 8, the disk ejection arms 17, which are shown on the section line 8—8 in FIG. 2, are cantilevered from the base portion 12 at a distance "x" at least 20 mm radially outward from the centre and preferably at least 30 mm therefrom, and at an angle "A" in the range 10 to 40 degrees and preferably in the range 20 to 30 degrees with respect to the base portion 12 when in the unstressed state, such that when the disk 25 is engaged by the segments 20, the arms 17 are flexed through an angle of only 5 to 20 degrees and preferably only 10 to 15 degrees and therefore are not unduly stressed and hence can reliably function over a long period. The arms 17 are each moulded with a pad-like end portion 26 adapted to engage on the annular inner area of the disk 25 that does not carry recorded information.

The ends of the arms 17 are preferably arranged to engage an area of the disk 25 approximately 5–10 mm radially outward of the edge of the central hole thereof.

It will thus be appreciated that the disk 25 can be reliably and easily removed from the apparatus by simply pressing the button-like member 16 whereupon the disk 25 is released from engagement therewith and the resilient arms 17 act to list the disk 25 a few millimeters so the disk 25 can be easily gripped by its outer edge and removed from the apparatus. The button-like member 16 is designed such that finger pressure on either part thereof will reliably release the disk 25 from engagement with the rim, or lip, 23 thereof.

The ejection arms 17 are flexed as a disk 25 is engaged on the apparatus so whilst the compact disk 25 is held in the apparatus it is resiliently supported against the underside of the capping rims or lips 23 and away from the base portion 12 by the resilient arms 17. The disk 25 is thereby protected from undue stock loads during handling or transit. The resilient ejection means 17 also serve to support this disk 25 when pressure P is applied to the button-like member 16 and so reduce flexure of the disk whilst the capping rims or lips 23 are disengaging from the disk.

Whereas the apparatus illustrated in the drawings includes four resilient arms 17, the apparatus should include at least two and preferably at least three such arms 17 in order to provide stable support and ejection of a disk 15, and the apparatus may include more than four arms 17 although spatial limitation may restrict the number of arms 17 that can be accommodated without unduly weakening the base 12 and/or compromising en reliability of the arms 17.

Moreover, the resilient arms 17 may be omitted, and the resilient disk ejection means may comprise one or more pieces of compressible material, e.g. foam, located in a position such as that shown by the dotted circle 17A in FIG. 2, to act between the base 12 and the disk 25.

As will also be seen in FIG. 8, the two resilient disk-engaging arms 15, which are shown as taken on the section line 6—6 in FIG. 2, are cantilevered from the base portion 12 at a distance "y" radially outward from the centre, which is preferably at least 10 mm and more preferably at least 15 mm, and at an angle "B" in the range 5 to 30 degrees, and preferably in the range 10–20 degrees, with respect to the base portion 12 when in the unstressed state, so that the arrangement is such that with a disk 25 engaged thereon, as shown in FIG. 6, the arms 15 are flexed through an angle of 10 degrees or less and preferably 5 degrees or less thereby ensuring that the apparatus can be repeatedly and reliably operated over a very long period.

As shown in FIG. 8, the arms 15, including the segments 20, have a length substantially similar to the distance "y" as the spacing between the segments 20 is typically less than 5 mm. The arms preferably have a width of at least 5 mm, and more preferably of 10 to 15 mm, and a thickness of 1 to 2 mm.

It will be appreciated that the arms 15 may have other shapes, eg they may be inclined to the base portion 12 where they are cantilevered thereto and then extend substantially parallel to the base portion 12 where they join with the segments 20.

Although the apparatus described has two arms 15, in a modified form of the apparatus (not shown) it may include three such arms each having its inner end moulded as a segment of a composite button-like disk-engaging member: and whereas even more than three such arms may be provided, it is considered that spatial limitations would prevent four or more such arms from being sufficiently sturdy to reliably withstand repeated use and would increase the difficulty of providing reliable mechanical interconnection between the ends of each of the arms.

Figure 9:
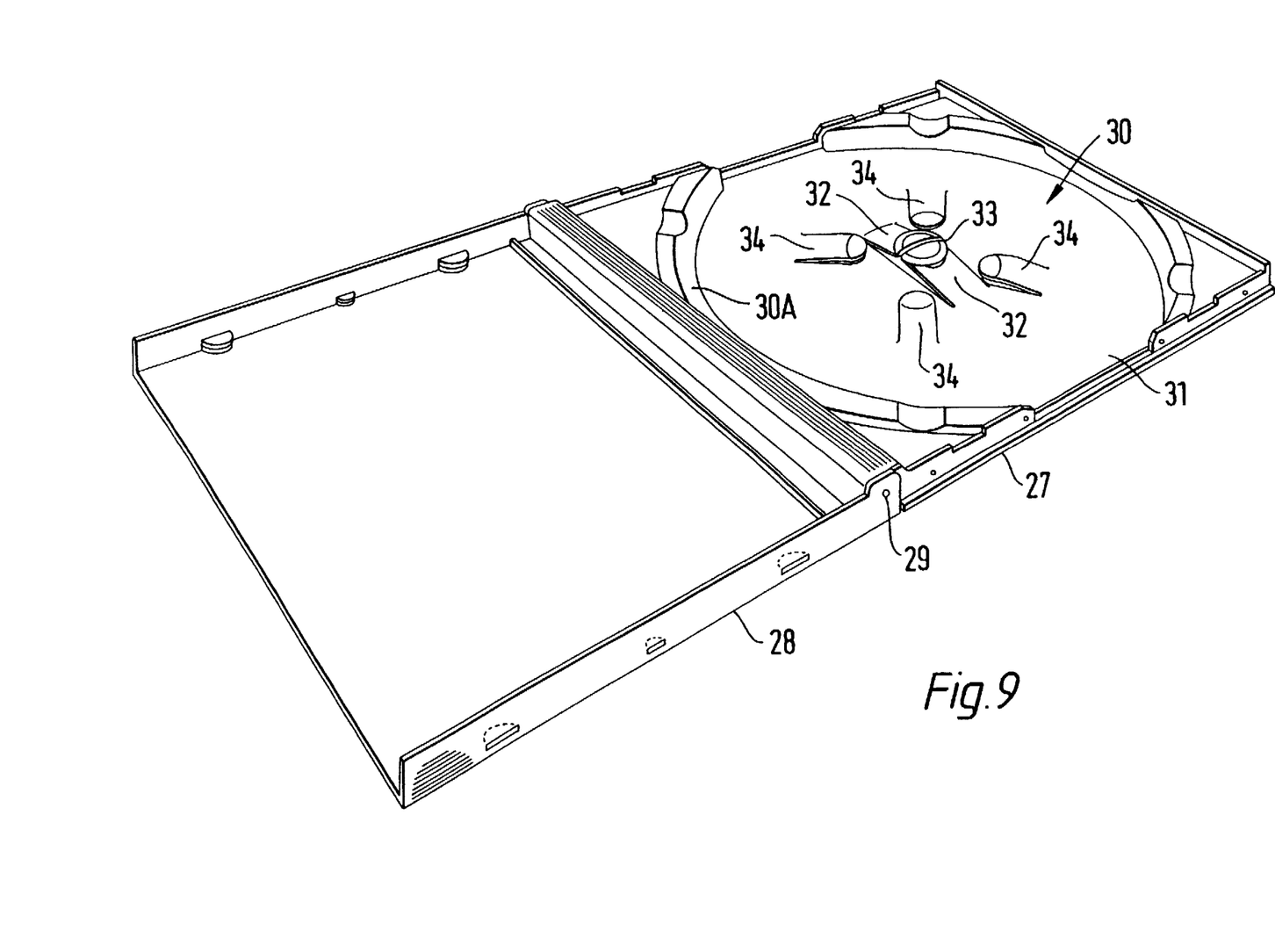
FIG. 9 is a perspective view of a tray incorporating apparatus for holding a compact disk fitted in a jewel-case according to another aspect of the invention.

The apparatus according to the invention may also, as shown in FIG. 9, be incorporated in a disk-holding tray for fitting in an otherwise conventional jewel-case. In FIG. 9, the jewel-case includes a conventional box potion 27 and lid portion 28 hinged together at 29 in known manner. Within the box portion 27 is inserted the apparatus for holding a compact disk, in the form of a tray, shown generally at 30, which comprises a partially annular rim 30A (of slightly different shape to that of FIG. 1), a base portion 31, two resilient inwardly extending arms 32 cantilevered from the base portion 31 and interconnected at their inner ends, with the inner ends being formed to provide a disk-engaging button 33 in similar manner to the button-like member 16 of the apparatus described with reference to the previous Figures. Moreover the jewel-case tray 30 shown in FIG. 9 also includes four resilient inwardly extending disk ejection arms 34 similar to the arms 17 shown in FIG. 1. Thus it should be understood that the apparatus of FIG. 9 is operated and functions in similar manner to that of the previous Figures and therefore does not require further description.

In a further embodiment, the resilient ejection means may be dispensed with and the residence of the disk itself used to permit the required movement for engagement of the disk with the engagement means and, on removal of the disk, to lift the disk clear of the engagement means once their engagement with the central hole of the disk as been released. This further embodiment will be descried with reference to FIG. 10.

Figure 10:
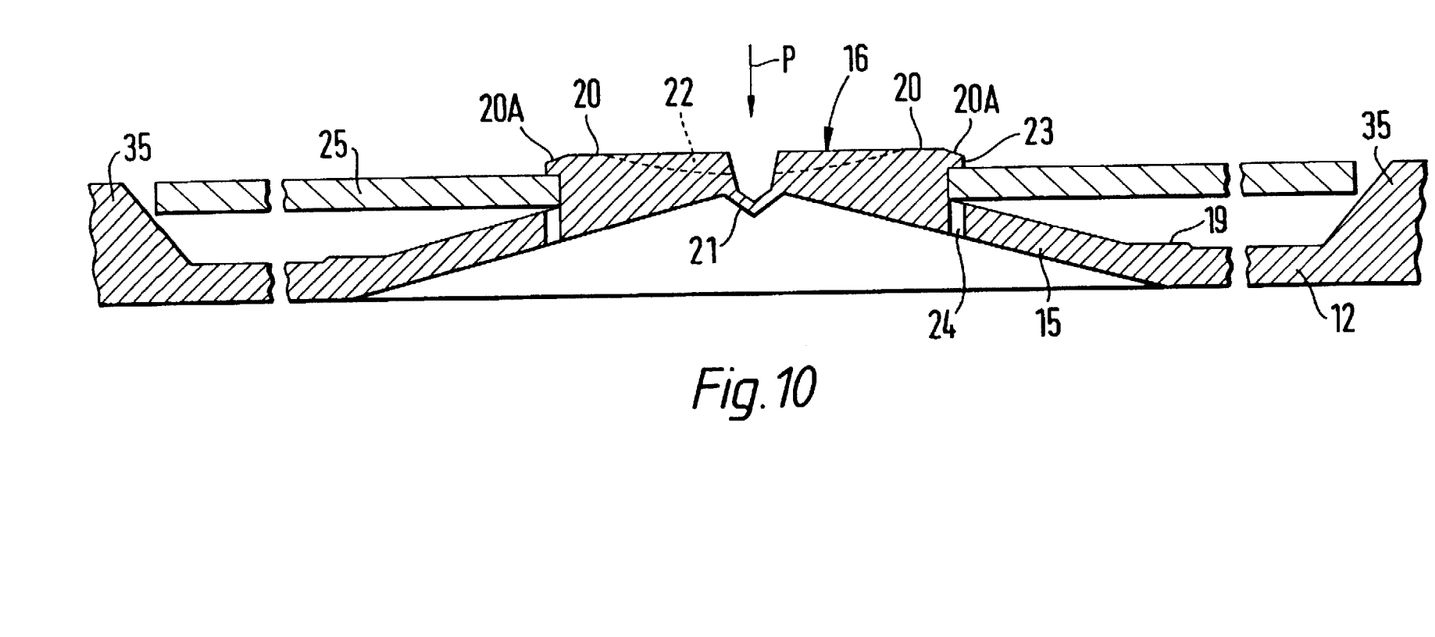
FIG. 10 is a cross-sectional view, corresponding to that of FIG. 6, of a further embodiment of the invention.

The apparatus shown in FIG. 10 has resilient arms 15 and a button-like member 16 etc similar to those of the embodiments described above so will not be described further. Disk support means 35 are, however, provided on the base portion 12 for supporting the disk, when pressure P is applied to the button-like member 16 as described above, the support being provided at positions away from the central hole of the disk 25, and preferably at the outer edge of the disk 25 as shown in FIG. 10.

The disk support means 35 are preferably arranged so that the disk 25 is held just clear of the support means 35 when the arms 15 are in their substantially unflexed positions whilst a disk 25 is held in the apparatus as shown in FIG. 10. When pressure P is applied to the button-like member 16, the disk 25 is moved towards the base portion 12 until its edges engage the support means 35. Further depression of the button-like member then presses the centre of the disk 25 towards the base portion 12 so the centre of the disk is flexed downwards until the capping rims or lips 23 release their engagement with the disk 25 and the disk is free to revert to its unstressed state whereupon the centre of the disk is able to move away from the base portion 12 and the disks 25 "pops up" ready from removal from the apparatus. As in the embodiments described above, the arms 15 also help lift the disk 25 once the button-like member 16 has been pushed through the central aperture to the underside of the disk and the pressure P removed.

Figure 11:
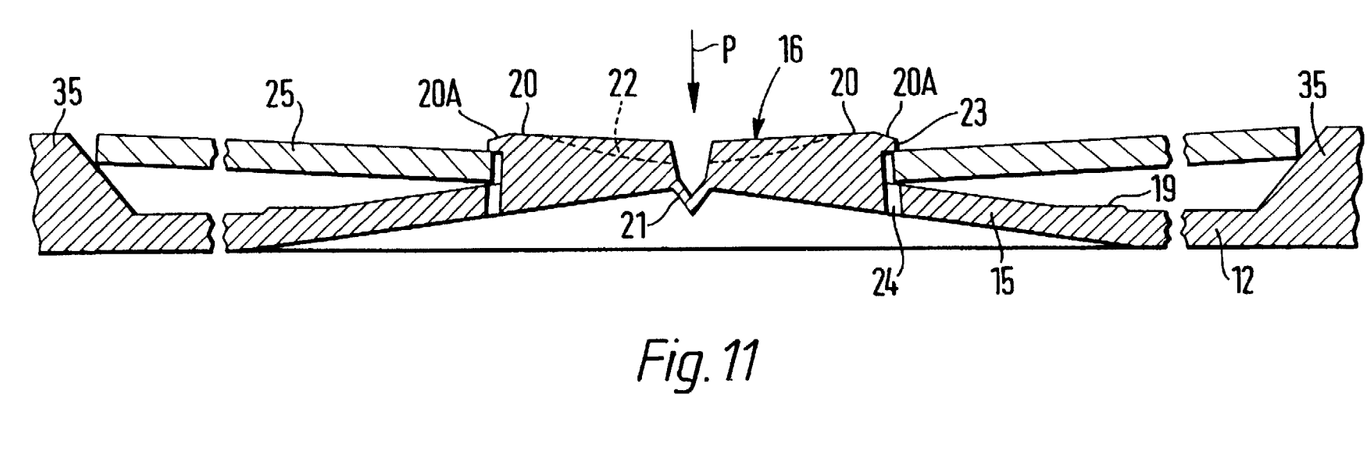
FIG. 11 is a cross-sectional view showing the disk of FIG. 10 in a flexed condition.

Although flexing of a compact disk is generally avoided (as in the embodiments described in relations to FIGS. 1 to 9), if the disk is supported at at least three, and preferably six, locations around its periphery, the flexure is distributed around the entire disk so that it flexes in a substantially similar manner to the flexing of a diaphragm as shown in FIG. 11.

As mentioned above in the description of FIGS. 1 to 10, at least the base portion 12 or 31, the ejection arms 17 or 34 (when provided) and the radial arms 15 or 32, may be formed as an integral plastics moulding and preferably the entire disk-holding tray or the video style library box is formed as a one-shot, integral moulding.

It will also be appreciated from the above that the apparatus for holding a disk may be provided in a video-style library box, preferably integrally moulded with a wall thereof as illustrated, or may be provided in some other form of box or enclosure either integrally moulded therewith or as an inset or tray installed therein.

We claim:

1. An apparatus for holding a compact disk having a central hole, the apparatus comprising:

a base portion;

at least two inwardly extending radial arms each resiliently cantilevered from the base portion;

a disk-engaging member formed by the inner ends of the arms and receivable in the central hole of the disk; and means for depressing at least the centre of a compact disk when pressure is applied to the disk-engaging member, comprising lips arranged to retain the disk by engaging on the outwardly facing surface of the disk, whereby when a disk is engaged on the disk-engaging member and pressure is applied to the disk-engaging member to depress the arms, at least the centre of the disk is depressed by at least one of the lips, and the inner ends of the arms move toward each other to release the lips from the outwardly facing surface of the disk.

2. The apparatus for holding a compact disk as claimed in claim 1 in which the inner ends of adjacent arms forming the disk-engaging member are interconnected by an integral living hinge.

3. The apparatus for holding a compact disk as claimed in claim 1 in which the disk-engaging member presents a generally concave outer surface.

4. The apparatus for holding a compact disk as claimed in claim 1 in which the arms connect to the base portion at positions at least 10 mm radially outward from the centre of the base portion.

5. The apparatus for holding a compact disk as claimed in claim 1 in which, in the undepressed state, the arms extend from the base portion at an angle in the range 5 to 30 degrees.

6. The apparatus for holding a compact disk as claimed in claim 1 in which the arms are arranged to flex through an angle of 10 degrees or less so as to release their engagement with the disk.

7. The apparatus for holding a compact disk as claimed in claim 1 having at least two and no more than three resilient inwardly extending radial arms.

8. The apparatus for holding a compact disk as claimed in claim 1 having resilient ejection means arranged to urge the disk out of engagement with the disk-engaging member upon disengagement of the lips from the outwardly facing surface of the disk.

9. The apparatus for holding a compact disk as claimed in claim 8 in which the resilient ejection means are arranged to resiliently support the disk away from the base when the disk is held by the disk-engaging member.

10. The apparatus for holding a compact disk as claimed in claim 8 in which the resilient ejection means comprises a plurality of further inwardly extending arms resiliently cantilevered from the base portion.

11. The apparatus for holding a compact disk as claimed in claim 10 in which the further arms connect to the base portion at positions at least 20 mm radially outward from the centre thereof.

12. The apparatus for holding a compact disk as claimed in claim 10 in which in an undepressed state, the further arms extend away from the base portion at an angle in the range 10 to 40 degrees.

13. The apparatus for holding a compact disk as claimed in claim 10 in which the further arms are arranged to flex through an angle in the range 5 to 20 degrees, in use, between a depressed position and an undepressed position.

14. The apparatus for holding a compact disk as claimed in claim 10 comprising at least three further arms and no more than four further arms.

15. The apparatus for holding a compact disk as claimed in claim 8 in which the resilient ejection means comprises at least one piece of compressible material which is compressed when the disk is held by the disk-engaging member and expands to move the disk out of engagement with the disk-engaging member when the lips are disengaged from the outwardly facing surface of the disk.

16. The apparatus for holding a compact disk as claimed in claim 8 in which the resilient ejection means is positioned so as to engage an area of the disk radially outward of the central hole thereof.

17. The apparatus for holding a compact disk as claimed in claim 16 in which the resilient ejection means is positioned so as to engage an area of the disk which does not carry recorded information.

18. The apparatus for holding a compact disk as claimed in claim 1 in which the base portion forms part of a tray for fitting into a disk storage container.

19. The apparatus for holding a compact disk as claimed in claim 1 in which the base portion forms part of a wall of a disk storage container.

20. The apparatus for holding a compact disk as claimed in claim 1 in which the base portion, disk-engaging member, radial arms and lips are formed as an integral plastics moulding.

21. The apparatus for holding a compact disk as claimed in claim 20 in which the plastics material is selected from the group consisting of polypropylene and a copolymer of butadiene and styrene.

22. The apparatus for holding a compact disk as claimed in claim 1, wherein the apparatus is integrally moulded in a one-piece video style library box.

23. An apparatus for holding a compact disk having a central hole, the apparatus comprising:

a base portion;

disk-engaging means extending from the base portion for releasably engaging the central hole of the disk and supporting the centre of the disk away from the base portion;

disk support means on the base portion for supporting the disk at positions away from the central hole; and means for flexing a compact disk comprising said disk support means positioned such that when the disk engages the disk support means, the centre of the disk may be flexed toward the base portion until release of the disk-engaging means from the central hole, the resilience of the disk itself lifting the disk out of engagement with the disk-engaging means.

24. The apparatus for holding a compact disk as claimed in claim 23 in which the disk support means is arranged to support a disk at a plurality of locations around the outer edge thereof when pressure is applied to the centre of the disk.

25. The apparatus for holding a compact disk as claimed in claim 23 in which the disk-engaging means hold a disk clear of the disk support means when engaged with the central hole of the disk.

26. The apparatus for holding a compact disk as claimed in claim 23, wherein the apparatus is integrally moulded in a one-piece video style library box.

27. In combination, a compact disk having a central hole, and an apparatus for holding the compact disk, said apparatus comprising:

a base portion;

at least two inwardly extending radial arms each resiliently cantilevered from the base portion, the inner ends of the arms together forming a disk-engaging member receivable in the central hole of the disk; and means for depressing at least the centre of the compact disk comprising lips arranged to retain the disk by engaging on the outwardly facing surface of the disk, such that, when pressure is applied to the disk-engaging member to depress the arms, the lips depress at least the centre of the disk, until movement of the inner ends of the arms toward each other caused by depression of the arms is sufficient to release the engagement of the lips on the outwardly facing surface of the disk.

28. In combination, a compact disk having a central hole and an apparatus for holding the compact disk, said apparatus comprising:

a base portion;

disk-engaging means extending from the base portion for releasably engaging the central hole of the disk;

disk support means on the base portion for supporting the disk at positions away from the central hole; and means for flexing the compact disk such that when the disk-engaging means is depressed, the disk engages the disk support means, and the centre of the disk flexes toward the base portion so that the disk-engaging means is released from the central hole, and the disk reverts to an unflexed state out of engagement with the disk-engaging means.

* * * * *

UNITED STATES PATENT AND TRADEMARK OFFICE
CERTIFICATE OF CORRECTION

PATENT NO. : 5,788,068
DATED : August 4, 1998
INVENTOR(S) : Anthony H.J. Fraser et al.

It is certified that error appears in the above-identified patent and that said Letters Patent is hereby corrected as shown below:

Column 2 Line 6 "Such poor art" should read --Such prior art--.

Column 2 Line 8 "operate easily" should read --operate as easily--.

Column 2 Line 45 "so any" should read --of any--.

Column 2 Line 49 "of the, rims" should read --of the rims--.

Column 3 Line 61 "respect of" should read --respectively, of--.

Column 4 Line 26 "female pus" should read --female parts--.

Column 6 Line 5 "list the disk" should read --lift the disk--.

Column 6 Line 27 "en reliability" should read --the reliability--.

Column 7 Line 22 "residence" should read --resilience--.

Column 7 Line 27 "descried" should read --described--.

Signed and Sealed this

Second Day of March, 1999

*Attest:*

Q. TODD DICKINSON

*Attesting Officer*  *Acting Commissioner of Patents and Trademarks*